US012791045B2

United States Patent
Kondo et al.

(10) Patent No.: US 12,791,045 B2
(45) Date of Patent: Nov. 10, 2026

(54) CONTROL CIRCUITRY AND PUMP SYSTEM

(71) Applicant: KAWASAKI JUKOGYO KABUSHIKI KAISHA, Kobe (JP)

(72) Inventors: Akihiro Kondo, Kobe (JP); Yousuke Kataoka, Kobe (JP); Jun Umekawa, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 344 days.

(21) Appl. No.: 18/435,315

(22) Filed: Feb. 7, 2024

(65) Prior Publication Data

US 2024/0352952 A1 Oct. 24, 2024

(30) Foreign Application Priority Data

Apr. 24, 2023 (JP) ................................. 2023-070599

(51) Int. Cl.
*F15B 15/20* (2006.01)

(52) U.S. Cl.
CPC ......... *F15B 15/20* (2013.01); *F15B 2211/426* (2013.01)

(58) Field of Classification Search
CPC .. F15B 15/20; F15B 2211/426; F15B 21/087; F15B 2211/20515; F15B 2211/20523; F15B 2211/20546; F15B 2211/633; F15B 2211/6333; F15B 2211/6346; F15B 2211/6652; F15B 11/0423; F15B 19/002; F04B 2203/0201; F04B 2203/0209;
(Continued)

(56) References Cited

U.S. PATENT DOCUMENTS

2012/0065482 A1* 3/2012 Robinson ......... A61B 5/150389 600/309
2012/0185141 A1* 7/2012 Kamado ............... F04B 49/002 701/50
(Continued)

FOREIGN PATENT DOCUMENTS

CN 115638151 A 1/2023
JP 2012-007302 A 1/2012
(Continued)

*Primary Examiner* — Ziaul Karim
(74) *Attorney, Agent, or Firm* — Oliff PLC

(57) ABSTRACT

Control circuitry feeds a command current to a hydraulic pump whose displacement increases in accordance with increase in the command current. The displacement of the hydraulic pump is a delivery amount per rotation of the hydraulic pump. The control circuitry receives an input of actual measurement data, the data either indicating an actual relationship between the command current and the displacement of the hydraulic pump or indicating a predetermined rotation speed and an actual relationship between the command current and a delivery flow rate of the hydraulic pump at the predetermined rotation speed; and receives an input of a minimum-use displacement of the hydraulic pump or a minimum-use delivery flow rate of the hydraulic pump at a reference rotation speed. The control circuitry determines a minimum-use electric current by using the actual measurement data, the minimum-use electric current corresponding to the minimum-use displacement or the minimum-use delivery flow rate.

4 Claims, 4 Drawing Sheets

(58) Field of Classification Search
CPC .... F04B 2205/09; F04B 49/065; F04B 49/06; F04B 51/00
See application file for complete search history.

(56) References Cited

U.S. PATENT DOCUMENTS

| | | | | |
|---|---|---|---|---|
| 2018/0252213 | A1* | 9/2018 | Afshari | F04B 49/22 |
| 2021/0216051 | A1 | 7/2021 | Kondo et al. | |
| 2021/0339595 | A1* | 11/2021 | Anderson | B60G 13/14 |
| 2022/0108262 | A1* | 4/2022 | Cella | G06Q 10/063118 |
| 2023/0111071 | A1* | 4/2023 | Cella | G01M 13/028<br>702/188 |
| 2025/0126347 | A1 | 4/2025 | Kondo et al. | |

FOREIGN PATENT DOCUMENTS

| | | | |
|---|---|---|---|
| JP | 2019-210974 | A | 12/2019 |
| JP | 2022-076550 | A | 5/2022 |
| JP | 2022-140429 | A | 9/2022 |

* cited by examiner

CONTROL CIRCUITRY AND PUMP SYSTEM

CROSS-REFERENCE TO RELATED APPLICATION

This application claims priority to and the benefit of Japanese Patent Application No. 2023-070599, filed on Apr. 24, 2023, the entire disclosure of which is incorporated herein by reference.

BACKGROUND OF THE INVENTION

Field of the Invention

The present disclosure relates to control circuitry for a hydraulic pump, and to a pump system including the control circuitry.

Description of the Related Art

In machines such as construction machines or industrial machines, there is a case where a hydraulic pump whose displacement, i.e., a delivery amount per rotation, increases in accordance with increase in a command current is adopted as a hydraulic pump to supply a hydraulic liquid to a hydraulic actuator. (See, for example, Japanese Laid-Open Patent Application Publication No. 2019-210974.) In this case, the pump is controlled by control circuitry, such that the displacement of the hydraulic pump increases in accordance with increase in the moving speed of the hydraulic actuator.

Specifically, an operation signal corresponding to an operating amount of an operator to move the hydraulic actuator is inputted to the control circuitry. The operator is a device to determine the moving speed of the hydraulic actuator by the operating amount of the operator. The control circuitry feeds a command current corresponding to the operation signal to the pump.

SUMMARY OF THE INVENTION

Incidentally, a required minimum displacement of a hydraulic pump differs depending on what machine the hydraulic pump is installed in. In the case of a hydraulic pump whose displacement increases in accordance with increase in a command current, a minimum-use displacement of the hydraulic pump, which is greater than or equal to the mechanical minimum displacement of the hydraulic pump, can be electrically set. By setting the minimum-use displacement of the hydraulic pump in this manner, the same hydraulic pump is usable in different machines that require different minimum pump displacements, respectively.

However, hydraulic pumps, due to their individual differences, vary from each other in terms of I-q characteristics. The I-q characteristics are a relationship between the command current and the displacement. Accordingly, in a case where a minimum-use electric current corresponding to the minimum-use displacement is determined based on design performance characteristics, there is a possibility that the minimum-use displacement deviates from a value to which the minimum-use displacement is to be set.

There is a case where not the minimum displacement, but the minimum delivery flow rate at a reference rotation speed is required from a hydraulic pump. In this case, similar to the above, a minimum-use delivery flow rate at the reference rotation speed can be set electrically. However, in a case where a minimum-use electric current corresponding to the minimum-use delivery flow rate is determined based on design performance characteristics, there is a possibility that, for the same reason as mentioned above, the minimum-use delivery flow rate deviates from a value to which the minimum-use delivery flow rate is to be set.

In view of the above, an object of the present disclosure is to provide control circuitry that is capable of precisely setting the minimum-use displacement of a hydraulic pump, or the minimum-use delivery flow rate of the hydraulic pump at a reference rotation speed, and to provide a pump system including the control circuitry.

In one aspect, the present disclosure provides control circuitry for feeding a command current to a hydraulic pump whose displacement increases in accordance with increase in the command current, the displacement of the hydraulic pump being a delivery amount per rotation of the hydraulic pump. The control circuitry: receives an input of actual measurement data, the actual measurement data either indicating an actual relationship between the command current and the displacement of the hydraulic pump or indicating a predetermined rotation speed and an actual relationship between the command current and a delivery flow rate of the hydraulic pump at the predetermined rotation speed; receives an input of a minimum-use displacement of the hydraulic pump or a minimum-use delivery flow rate of the hydraulic pump at a reference rotation speed; and determines a minimum-use electric current by using the actual measurement data, the minimum-use electric current corresponding to the minimum-use displacement or the minimum-use delivery flow rate.

In another aspect, the present disclosure provides a pump system including: a hydraulic pump whose displacement increases in accordance with increase in a command current, the displacement of the hydraulic pump being a delivery amount per rotation of the hydraulic pump; the above-described control circuitry, which feeds the command current to the hydraulic pump; a symbol displayed on a surface of the hydraulic pump, the symbol storing the actual measurement data or save location information on the actual measurement data, the actual measurement data either indicating the actual relationship between the command current and the displacement of the hydraulic pump or indicating the predetermined rotation speed and the actual relationship between the command current and the delivery flow rate of the hydraulic pump at the predetermined rotation speed; and a mobile terminal that obtains the actual measurement data by capturing an image of the symbol and that transmits the obtained actual measurement data to the control circuitry via wireless communication.

The present disclosure provides control circuitry that is capable of precisely setting the minimum-use displacement of a hydraulic pump, or the minimum-use delivery flow rate of the hydraulic pump at a reference rotation speed, and provides a pump system including the control circuitry.

DETAILED DESCRIPTION

Figure 1:
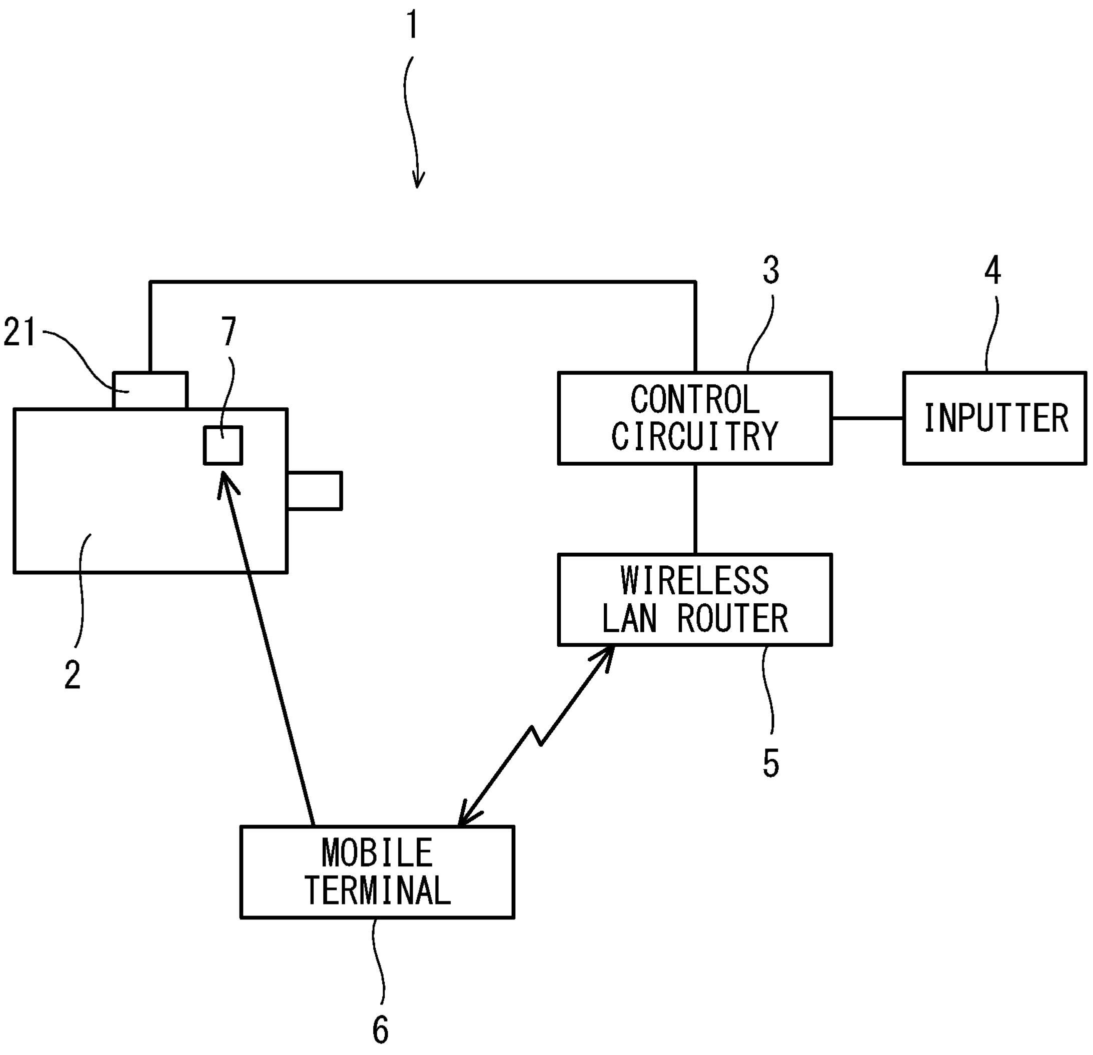
FIG. 1 shows a schematic configuration of a pump system including control circuitry according to one embodiment.
Figure 2:
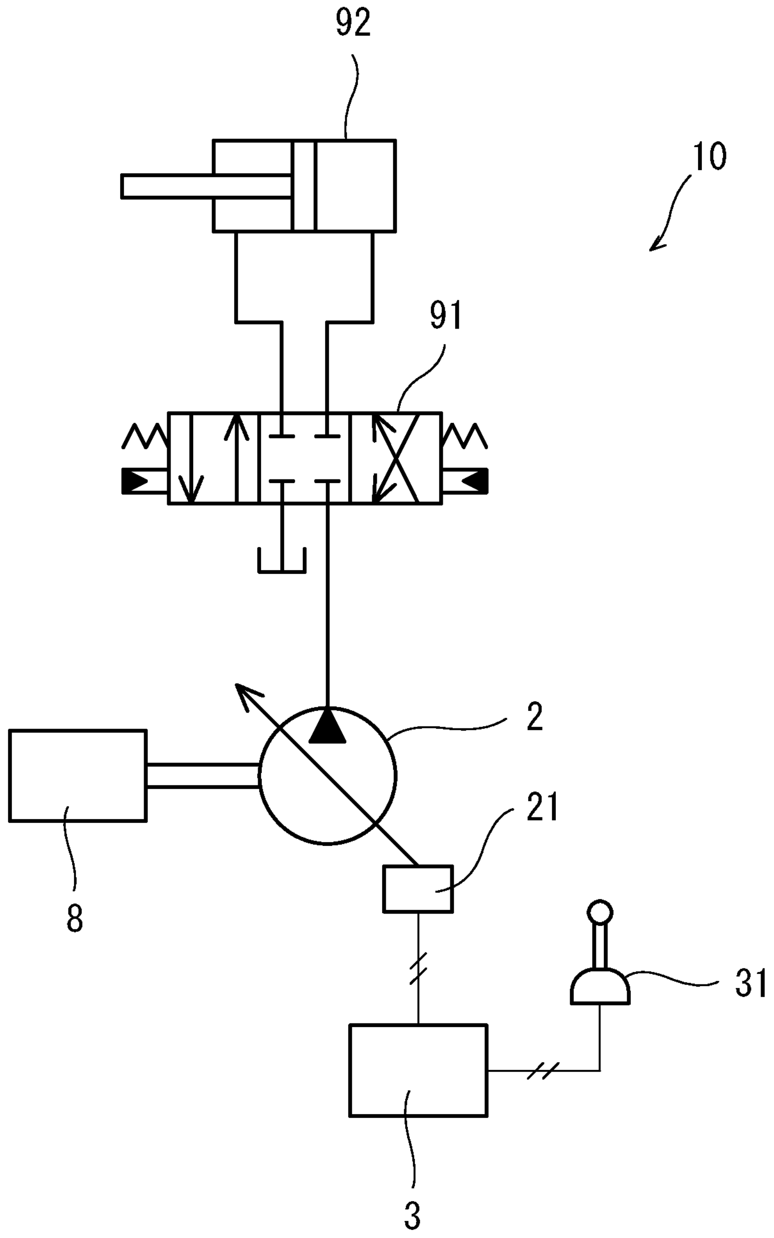
FIG. 2 shows a schematic configuration of a hydraulic system including a hydraulic pump and the control circuitry.

FIG. 1 shows a pump system 1, which includes a hydraulic pump 2 and control circuitry 3 for the hydraulic pump 2 according to one embodiment. FIG. 2 shows a hydraulic system 10, which includes the hydraulic pump 2, a hydraulic actuator 92, and the control circuitry 3. Typically, a hydraulic liquid used in the hydraulic system 10 is oil.

First, the hydraulic system 10 is described with reference to FIG. 2. The hydraulic system 10 is installed in, for example, a construction machine such as a hydraulic excavator or a hydraulic crane, or in an industrial machine such as a press machine.

The hydraulic pump 2 is a variable displacement pump. In the present embodiment, the hydraulic pump 2 is an axial piston pump, such as a swash plate pump or a bent axis pump. Alternatively, the hydraulic pump 2 may be a different type of pump, such as a vane pump.

The hydraulic pump 2 is driven by a prime mover 8. The prime mover 8 may be an engine, or may be an electric motor.

A displacement q of the hydraulic pump 2, which is a delivery amount per rotation of the hydraulic pump 2, is changed by a regulator 21 installed on the hydraulic pump 2. The regulator 21 is fed with a command current I from the control circuitry 3. For example, in a case where the hydraulic pump 2 is a swash plate pump, the regulator 21 may electrically change a hydraulic pressure applied to a servo piston coupled to the swash plate of the hydraulic pump 2, or may be an electric actuator coupled to the swash plate of the hydraulic pump 2.

Figure 3:
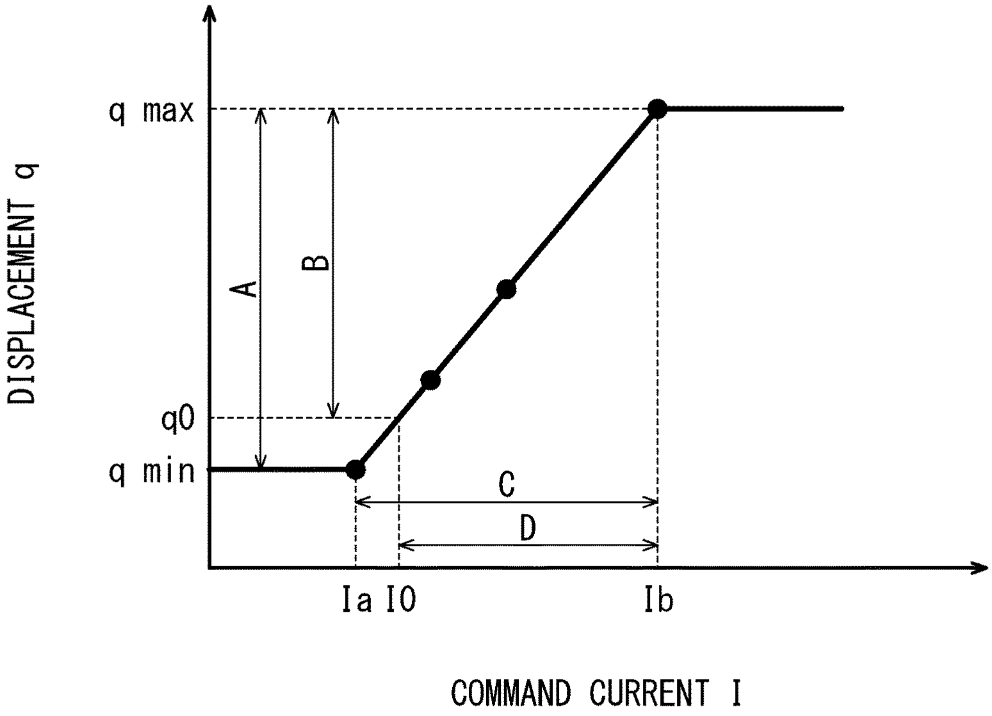
FIG. 3 is a graph showing a relationship between a command current and a displacement of the hydraulic pump.

The displacement q of the hydraulic pump 2 changes between a mechanical minimum displacement qmin and a mechanical maximum displacement qmax in accordance with the command current I. FIG. 3 shows I-q characteristics, i.e., a relationship between the command current I and the displacement q. When the command current I is less than or equal to Ia, the displacement q is the minimum displacement qmin. When the command current I is greater than or equal to Ib, the displacement q is the maximum displacement qmax. When the command current I is between Ia and Ib, the displacement q increases in accordance with increase in the command current I.

Returning to FIG. 2, the hydraulic pump 2 supplies the hydraulic liquid to the hydraulic actuator 92 via a direction-switching valve 91. The number of hydraulic actuators 92 may be one, or may be plural. In the present embodiment, the hydraulic actuator 92 is a double-acting cylinder or hydraulic motor that moves bi-directionally.

The hydraulic system 10 further includes an operator 31, which is a device to move the hydraulic actuator 92. The operator 31 outputs an operation signal corresponding to an operating amount of the operator 31. In the present embodiment, the operator 31 is an electrical joystick that outputs an electrical signal as the operation signal. The operation signal outputted from the operator 31 is inputted to the control circuitry 3.

In a case where the hydraulic system 10 is installed in an unmanned machine, the operator 31 may be eliminated. In this case, the control circuitry 3 may generate the operation signal based on, for example, an image captured by a camera or the like.

In the present embodiment, the aforementioned direction-switching valve 91 includes a pair of pilot ports, and solenoid proportional valves are connected to the respective pilot ports. The control circuitry 3 controls the direction-switching valve 91 via the solenoid proportional valves, such that the opening area of the direction-switching valve 91 increases in accordance with increase in the operating amount of the operator 31. Accordingly, the moving speed of the hydraulic actuator 92 increases in accordance with increase in the operating amount of the operator 31.

Alternatively, the operator 31 may be a pilot operation valve that outputs pilot pressures to the respective pilot ports of the direction-switching valve 91. Each pilot pressure outputted from the pilot operation valve increases in accordance with increase in the operating amount of the operator 31, which is the pilot operation valve. In a case where the operator 31 is a pilot operation valve, each pilot pressure outputted from the operator 31 is detected by a corresponding one of pressure sensors, and inputted to the control circuitry 3 as an operation signal. Alternatively, the direction-switching valve 91 may be a solenoid valve that is directly controlled by the control circuitry 3.

The control circuitry 3 feeds the command current I corresponding to the operation signal to the regulator 21. The command current I increases in accordance with increase in the operating amount of the operator 31. Accordingly, the displacement q of the hydraulic pump 2 increases in accordance with increase in the operating amount of the operator 31.

Next, the pump system 1 is described with reference to FIG. 1. Regarding the control circuitry 3, the functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the present disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

An inputter 4 is electrically connected to the control circuitry 3. The inputter 4 receives an input of a minimum-use displacement q0 of the hydraulic pump 2. The minimum-use displacement q0 of the hydraulic pump 2 is inputted to the control circuitry 3 via the inputter 4.

As shown in FIG. 3, the minimum-use displacement q0 defines the lower limit of the range of use of the displacement q when the hydraulic pump 2 is installed in a machine. The minimum-use displacement q0 may be the same as the mechanical minimum displacement qmin, or may be greater than the minimum displacement qmin.

In a case where the minimum-use displacement q0 is the same as the mechanical minimum displacement qmin, when the hydraulic pump 2 is installed in a machine, the range of use of the displacement q is a range A shown in FIG. 3, and the range of use of the command current I is a range C shown in FIG. 3. On the other hand, in a case where the minimum-use displacement q0 is greater than the mechanical minimum displacement qmin, when the hydraulic pump 2 is installed in a machine, the range of use of the displacement q is a range B shown in FIG. 3, and the range of use of the command current I is a range D shown in FIG. 3.

Returning to FIG. 1, the pump system 1 includes, in addition to the hydraulic pump 2 and the control circuitry 3, a mobile terminal 6, which is communicable with the control circuitry 3 via wireless communication. In the present embodiment, a wireless LAN router 5 is wire-connected to the control circuitry 3, and the mobile terminal 6 performs wireless communication with the wireless LAN router 5. Alternatively, the control circuitry 3 may include a wireless communication module, and the mobile terminal 6 may directly perform wireless communication with the control circuitry 3.

A symbol 7 is displayed on the surface of the hydraulic pump 2. For the display of the symbol 7 on the surface of the hydraulic pump 2, the symbol 7 may be printed on a plate, such as a nameplate or a display plate, and the plate may be mounted to the surface of the hydraulic pump 2. Alternatively, the symbol 7 may be directly printed on the surface of the hydraulic pump 2.

In the present embodiment, the symbol 7 stores actual measurement data that indicates actual I-q characteristics of the hydraulic pump 2. The actual I-q characteristics are test results obtained from a performance validation test conducted on the hydraulic pump 2. For example, the symbol 7 is a matrix two-dimensional code (QR code (registered trademark)). Alternatively, the symbol 7 may be a tag, such as an IC (Integrated Circuit) tag or an RFID (Radio Frequency Identification) tag.

The mobile terminal 6 includes a camera that can capture an image of the symbol 7. As a result of the camera capturing the image of the symbol 7, the mobile terminal 6 obtains the actual measurement data of the hydraulic pump 2, which is stored on the symbol 7. The mobile terminal 6 transmits the obtained actual measurement data to the control circuitry 3 via wireless communication and the wireless LAN router 5. As a result, the actual measurement data of the hydraulic pump 2 is inputted to the control circuitry 3. In this manner, the actual measurement data can be readily inputted to the control circuitry 3.

The control circuitry 3 stores therein the inputted actual measurement data of the hydraulic pump 2. Then, the control circuitry 3 electronically calibrates the variation in the I-q characteristics due to the individual differences. Specifically, the control circuitry 3 adjusts the command current I fed to the hydraulic pump 2, so that a preset displacement corresponding to an operation signal is obtained.

Further, in the present embodiment, the control circuitry 3 determines a minimum-use electric current I0 corresponding to the minimum-use displacement q0, by using the stored actual measurement data. Examples of a method of determining the minimum-use electric current I0 include a method illustrated in FIG. 4 and a method illustrated in FIG. 5.

Figure 4:
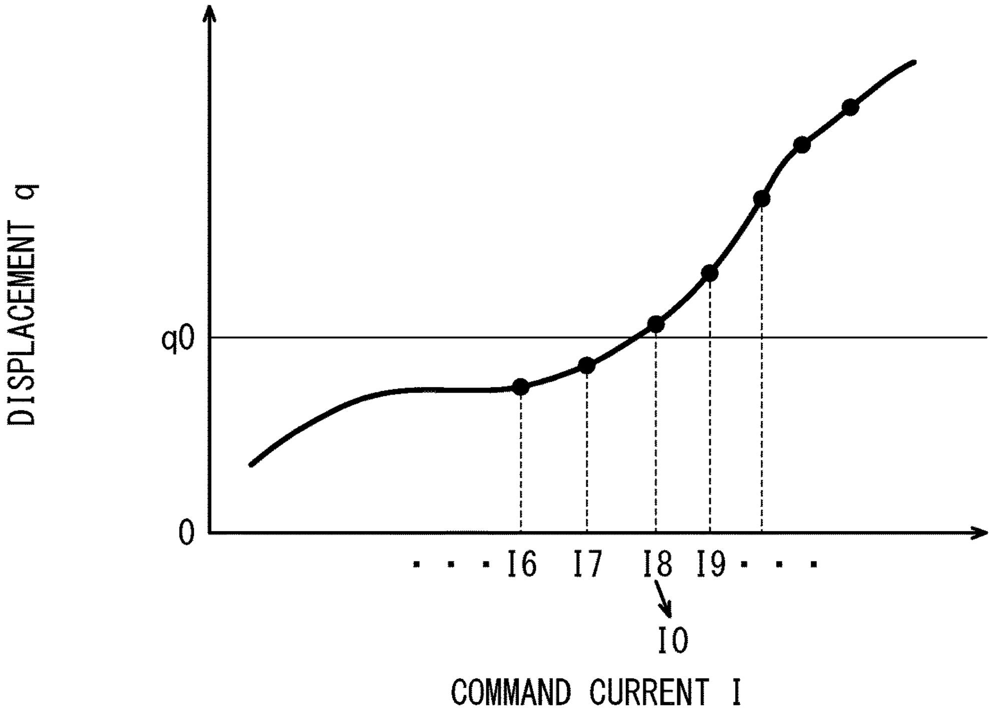
FIG. 4 illustrates a method of determining a minimum-use electric current.
Figure 5:
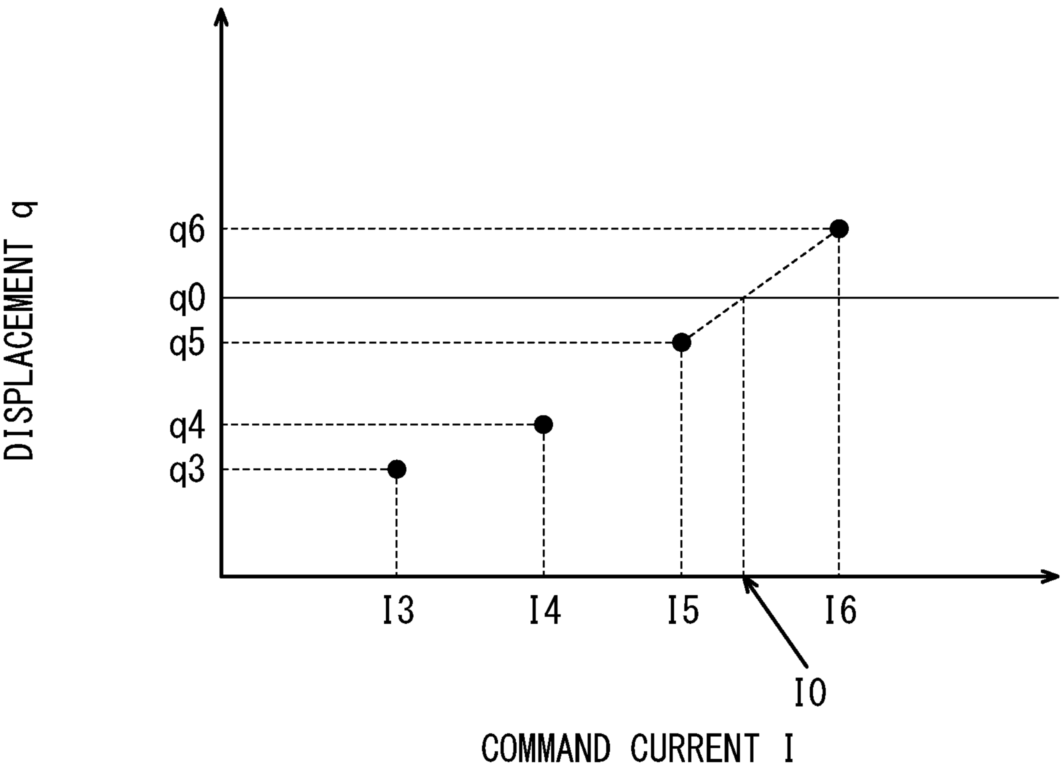
FIG. 5 illustrates another method of determining the minimum-use electric current.

In the method illustrated in FIG. 4, among the actual measurement data of the hydraulic pump 2, a command current at a data point that is closest to the minimum-use displacement q0 (in FIG. 4, 18) is determined as the minimum-use electric current I0. In the method illustrated in FIG. 5, among the actual measurement data of the hydraulic pump 2, data points located on both sides of the minimum-use displacement q0 are connected by a straight line, and the minimum-use electric current I0 corresponding to the minimum-use displacement q0 is calculated from the straight line.

As described above, the control circuitry 3 of the present embodiment determines the minimum-use electric current I0 by using the actual measurement data. This makes it possible to precisely set the minimum-use displacement q0 of the hydraulic pump 2.

Further, in the present embodiment, since the minimum-use displacement q0 of the hydraulic pump 2 is inputted to the control circuitry 3 via the inputter 4, a user of the hydraulic pump 2 and the control circuitry 3 can set the minimum-use displacement q0 to an arbitrary value.

<Variations>

The present disclosure is not limited to the above-described embodiment. Various modifications can be made without departing from the scope of the present disclosure.

For example, instead of storing the actual measurement data of the hydraulic pump 2, the symbol 7 may store save location information on the actual measurement data. The save location information is, for example, the IP (Internet Protocol) address of a server that is the save location, or the URL (Uniform Resource Locator) of a particular hierarchy level of the server. In this case, the symbol 7 may be a character string.

Instead of the minimum-use displacement q0, a minimum-use delivery flow rate Q0 at a reference rotation speed Nr may be inputted to the control circuitry 3 via the inputter 4. According to this configuration, a user of the hydraulic pump 2 and the control circuitry 3 can set the minimum-use delivery flow rate Q0 at the reference rotation speed Nr to an arbitrary value.

In a case where the minimum-use delivery flow rate Q0 at the reference rotation speed Nr is inputted to the control circuitry 3, the control circuitry 3 calculates the minimum-use displacement q0 by dividing the minimum-use delivery flow rate Q0 by the reference rotation speed Nr, and determines the minimum-use electric current I0 corresponding to the minimum-use displacement q0 by using the actual measurement data indicating the actual I-q characteristics. By determining the minimum-use electric current I0 by using the actual measurement data in this manner, the minimum-use delivery flow rate Q0 of the hydraulic pump 2 at the reference rotation speed Nr can be set precisely.

The actual measurement data need not be one indicating the actual I-q characteristics, but may be one indicating a predetermined rotation speed Np and an actual relationship between the command current I and the delivery flow rate Q of the hydraulic pump 2 at the predetermined rotation speed Np, i.e., actual I-Q characteristics at the predetermined rotation speed Np.

In a case where the actual measurement data is one indicating the predetermined rotation speed Np and the actual I-Q characteristics at the predetermined rotation speed Np and where the minimum-use delivery flow rate Q0 at the reference rotation speed Nr is inputted to the control circuitry 3, for example, the control circuitry 3 calculates a converted flow rate by multiplying the minimum-use delivery flow rate Q0 by Np/Nr, and determines the minimum-use electric current I0 corresponding to the converted flow rate by using the actual measurement data.

Alternatively, in a case where the actual measurement data is one indicating the predetermined rotation speed Np and the actual I-Q characteristics at the predetermined rotation speed Np and where the minimum-use displacement q0 is inputted to the control circuitry 3, for example, the control circuitry 3 calculates the minimum-use delivery flow rate at the predetermined rotation speed Np by multiplying the minimum-use displacement q0 by the predetermined rotation speed Np, and determines the minimum-use electric current I0 corresponding to the minimum-use delivery flow rate by using the actual measurement data.

SUMMARY

In one aspect, the present disclosure provides, as a first mode, control circuitry for feeding a command current to a hydraulic pump whose displacement increases in accordance with increase in the command current, the displacement of the hydraulic pump being a delivery amount per rotation of the hydraulic pump. The control circuitry: receives an input of actual measurement data, the actual measurement data either indicating an actual relationship between the command current and the displacement of the hydraulic pump or indicating a predetermined rotation speed and an actual relationship between the command current and a delivery flow rate of the hydraulic pump at the predetermined rotation speed; receives an input of a minimum-use displacement of the hydraulic pump or a minimum-use delivery flow rate of the hydraulic pump at a reference rotation speed; and determines a minimum-use electric current by using the actual measurement data, the minimum-use electric current corresponding to the minimum-use displacement or the minimum-use delivery flow rate.

According to the above configuration, since the minimum-use electric current is determined by using the actual measurement data, the minimum-use displacement of the hydraulic pump or the minimum-use delivery flow rate of the hydraulic pump at the reference rotation speed can be set precisely.

As a second mode, in the first mode, the minimum-use displacement or the minimum-use delivery flow rate of the hydraulic pump may be inputted to the control circuitry via an inputter that is electrically connected to the control circuitry. According to this configuration, a user of the hydraulic pump and the control circuitry can set the minimum-use displacement, or the minimum-use delivery flow rate at the reference rotation speed, to an arbitrary value.

In another aspect, the present disclosure provides, as a third mode, a pump system including: a hydraulic pump whose displacement increases in accordance with increase in a command current, the displacement of the hydraulic pump being a delivery amount per rotation of the hydraulic pump; the above-described control circuitry, which feeds the command current to the hydraulic pump; a symbol displayed on a surface of the hydraulic pump, the symbol storing the actual measurement data or save location information on the actual measurement data, the actual measurement data either indicating the actual relationship between the command current and the displacement of the hydraulic pump or indicating the predetermined rotation speed and the actual relationship between the command current and the delivery flow rate of the hydraulic pump at the predetermined rotation speed; and a mobile terminal that obtains the actual measurement data by capturing an image of the symbol and that transmits the obtained actual measurement data to the control circuitry via wireless communication.

According to the above configuration, the actual measurement data can be readily inputted to the control circuitry.

What is claimed is:

1. Control circuitry for feeding a command current to a hydraulic pump whose displacement increases in accordance with increase in the command current, the displacement of the hydraulic pump being a delivery amount per rotation of the hydraulic pump, wherein the control circuitry:

receives an input of actual measurement data, wherein the actual measurement data indicates one of i) an actual relationship between the command current and the displacement of the hydraulic pump and ii) a predetermined rotation speed and an actual relationship between the command current and a delivery flow rate of the hydraulic pump at the predetermined rotation speed;

receives an input of a minimum-use displacement of the hydraulic pump or a minimum-use delivery flow rate of the hydraulic pump at a reference rotation speed, wherein the minimum-use displacement defines a lower limit of a range of use of the displacement when the hydraulic pump is installed in a machine, and the minimum-use delivery flow rate is a value obtained by multiplying the minimum-use displacement by the reference rotation speed; and determines a minimum-use electric current by using the actual measurement data, the minimum-use electric current corresponding to the minimum-use displacement or the minimum-use delivery flow rate.

2. The control circuitry according to claim 1, wherein the minimum-use displacement or the minimum-use delivery flow rate of the hydraulic pump is inputted to the control circuitry via an inputter that is electrically connected to the control circuitry.

3. A pump system comprising:

the control circuitry according to claim 2, which feeds the command current to the hydraulic pump;

the hydraulic pump whose displacement increases in accordance with increase in the command current, the displacement of the hydraulic pump being the delivery amount per rotation of the hydraulic pump;

a symbol displayed on a surface of the hydraulic pump, the symbol storing the actual measurement data or save location information on the actual measurement data, the actual measurement data either indicating the actual relationship between the command current and the displacement of the hydraulic pump or indicating the predetermined rotation speed and the actual relationship between the command current and the delivery flow rate of the hydraulic pump at the predetermined rotation speed; and a mobile terminal that obtains the actual measurement data by capturing an image of the symbol and that transmits the obtained actual measurement data to the control circuitry via wireless communication.

4. A pump system comprising:

the control circuitry according to claim 1, which feeds the command current to the hydraulic pump, the hydraulic pump whose displacement increases in accordance with increase in the command current, the displacement of the hydraulic pump being the delivery amount per rotation of the hydraulic pump;

a symbol displayed on a surface of the hydraulic pump, the symbol storing the actual measurement data or save location information on the actual measurement data, the actual measurement data either indicating the actual relationship between the command current and the displacement of the hydraulic pump or indicating the predetermined rotation speed and the actual relationship between the command current and the delivery flow rate of the hydraulic pump at the predetermined rotation speed; and a mobile terminal that obtains the actual measurement data by capturing an image of the symbol and that transmits the obtained actual measurement data to the control circuitry via wireless communication.

* * * * *